United States Patent
Lu et al.

(10) Patent No.: US 11,584,846 B2
(45) Date of Patent: Feb. 21, 2023

(54) CARBON FIBER REINFORCED POLYOLEFIN COMPOSITIONS AND METHODS

(71) Applicant: EQUISTAR CHEMICALS, LP, Houston, TX (US)

(72) Inventors: Jue Lu, Okemos, MI (US); Changlai Yang, Okemos, MI (US); Michael J. Dammann, New Lothrop, MI (US)

(73) Assignee: Equistar Chemicals, LP, Houston, TX (US)

( * ) Notice: Subject to any disclaimer, the term of this patent is extended or adjusted under 35 U.S.C. 154(b) by 85 days.

(21) Appl. No.: 15/969,520

(22) Filed: May 2, 2018

(65) Prior Publication Data

US 2018/0319966 A1    Nov. 8, 2018

Related U.S. Application Data

(60) Provisional application No. 62/500,929, filed on May 3, 2017.

(51) Int. Cl.
| | | |
|---|---|---|
| C08L 23/12 | (2006.01) | |
| C08L 23/16 | (2006.01) | |
| C08K 3/04 | (2006.01) | |
| C08K 5/101 | (2006.01) | |
| C08K 7/04 | (2006.01) | |

(52) U.S. Cl.
CPC ............... *C08L 23/12* (2013.01); *C08K 3/04* (2013.01); *C08K 5/101* (2013.01); *C08K 7/04* (2013.01); *C08L 23/16* (2013.01); *C08L 2205/03* (2013.01); *C08L 2205/08* (2013.01); *C08L 2205/16* (2013.01); *C08L 2205/24* (2013.01); *C08L 2207/04* (2013.01); *C08L 2310/00* (2013.01)

(58) Field of Classification Search
CPC ...... C08L 23/12; C08L 23/16; C08L 2205/03; C08K 3/04
See application file for complete search history.

(56) References Cited

U.S. PATENT DOCUMENTS

| | | | |
|---|---|---|---|
| 5,331,046 A | 7/1994 | Chang et al. | |
| 2011/0086970 A1* | 4/2011 | Grein | C08F 210/06 524/528 |
| 2011/0301265 A1* | 12/2011 | Brunner | C08L 51/06 524/91 |
| 2014/0187694 A1 | 7/2014 | Jang et al. | |
| 2016/0060440 A1* | 3/2016 | Prieto | C08K 3/04 523/436 |
| 2016/0137823 A1 | 5/2016 | Kim et al. | |
| 2018/0016428 A1* | 1/2018 | Glenister | C08L 23/12 |

FOREIGN PATENT DOCUMENTS

| | | |
|---|---|---|
| CN | 102066478 A | 5/2011 |
| CN | 102264825 A | 11/2011 |
| CN | 102952309 A | 3/2013 |
| CN | 104558850 A | 4/2015 |
| EP | 2261277 A2 | 12/2010 |
| EP | 2452957 A1 | 5/2012 |
| EP | 3081591 A1 | 10/2016 |
| EP | 3095819 A1 | 11/2016 |
| JP | 2003049026 A | 2/2003 |
| JP | 2005194337 A | 7/2005 |
| JP | 2008163157 A | 7/2008 |
| JP | 2009275149 A | 11/2009 |
| JP | 2012513511 A | 6/2012 |
| JP | 2016525586 A | 8/2016 |
| JP | 2020513429 A | 5/2020 |
| WO | 2016033188 A1 | 3/2016 |
| WO | 2018017393 A1 | 1/2018 |

OTHER PUBLICATIONS

International Search Report and Written Opinion dated Aug. 2, 2018 (Aug. 2, 2018) for Corresponding PCT/US2018/030698.

* cited by examiner

*Primary Examiner* — Wenwen Cai

(57) ABSTRACT

The present disclosure generally relates to carbon fiber reinforced polyolefin compositions, which may have a relatively low density. The compositions may include a thermoplastic olefin, a filler component, a compatibilizer, and/or an additive package. In some embodiments, the filler component includes a plurality of carbon fibers. In addition, articles of manufacture and methods of making a carbon fiber reinforced polyolefin composition are provided.

15 Claims, No Drawings

CARBON FIBER REINFORCED POLYOLEFIN COMPOSITIONS AND METHODS

CROSS-REFERENCE TO RELATED APPLICATIONS

This application is a Non-Provisional application, which claims benefit of priority to U.S. Provisional Application No. 62/500,929, filed May 3, 2017, the contents of which are incorporated herein by reference in their entirety.

BACKGROUND OF THE INVENTION

In order to comply with increased fuel efficiency goals and other standards having an environmental impact (e.g., Corporate Average Fuel Economy (CAFE) in the US, and $CO_2$ limits in the European Union (E. U.)), the automotive industry currently pursues weight reduction for many components used to make vehicles.

Polyolefin-based compositions are used to make a number of automotive components, including, but not limited to, spare-wheel compartment covers, underbody panels, seat backrests, engine and transmission covers, bumper fascia, rear panel shelves, and door trim panels. Typically, efforts to reduce the weight of these parts by altering the polyolefin-based compositions has had a negative impact on one or more other important properties of the various parts, such as stiffness, shrinkage, cold temperature impact performance, etc.

For example, carbon fibers have been used as reinforcement in polymer composites, due in part to their light weight, high stiffness, excellent thermal stability, and/or electrical conductivity. However, adding carbon fiber to a polyolefin-based composition typically results in a decrease in cold temperature ductility. This disadvantage, along with the high cost of carbon fiber, typically limits the use of carbon fiber reinforcement in the automotive industry.

Furthermore, for painted bumper fascia application, thermoplastic olefin (TPO) solutions with well-balanced stiffness and/or cold temperature impact performance after painting are desirable.

Therefore, there remains a need for polyolefin-based compositions that achieve a weight reduction without compromising one or more other properties, such as those properties related to fit and function, which may include the compositions' coefficient of linear thermal expansion (CLTE), shrinkage, gap closure, etc. In addition, an electrically conductive TPO may be advantageous because such a material may have the potential to improve electrostatic painting transfer efficiency in painted automotive parts, such as a bumper fascia, which may result in a further cost saving.

SUMMARY OF THE INVENTION

The present disclosure generally relates to carbon fiber reinforced polyolefin compositions that may have a relatively low density and/or high dimensional stability while maintaining suitable stiffness and cold temperature impact properties, including the stiffness and cold temperature impact properties that are commonly associated with other polyolefin composites used in various industries, including the automobile industry. The carbon fiber reinforced polymer compositions provided herein also may be electrically conductive.

In embodiments, the compositions provided herein have a density of about 0.90 to about 0.98 g/cm$^3$, and include (a) a thermoplastic olefin resin including a polyolefin and an elastomer, wherein the thermoplastic olefin resin is present in the composition at an amount of about 80% to about 95%, by weight, based on the total weight of the composition; (b) a filler component including a plurality of carbon fibers, wherein the filler component is present at an amount of about 1% to about 15%, by weight, based on the total weight of the composition; (c) a compatibilizer, wherein the compatibilizer is present at an amount of about 0.5% to about 10%, by weight, based on the total weight of the composition; and (d) an additive package, wherein the additive package is present at an amount of about 0.5% to about 5%, by weight, based on the total weight of the composition. The thermoplastic olefin resin may include (i) a polyolefin including a polypropylene, a propylene-ethylene copolymer, or a combination thereof, wherein the polyolefin is present at an amount of about 40% to about 65%, by weight, based on a total weight of the composition; and (ii) an elastomer, wherein the elastomer is present at an amount of about 25% to about 45%, by weight, based on the total weight of the composition. In one embodiment, the thermoplastic olefin resin further comprises a reactor thermoplastic polyolefin, and the reactor thermoplastic polyolefin is present at an amount of about 0.01% to about 15%, by weight, based on the total weight of the composition.

Also provided herein are articles of manufacture, such as automotive panels, that include a carbon fiber reinforced polyolefin composition. In one embodiment, the panel is an automotive panel, which may be a bumper fascia.

While multiple embodiments are disclosed, still other embodiments will become apparent to those skilled in the art from the following detailed description. As will be apparent, certain embodiments, as disclosed herein, are capable of modifications in various aspects, all without departing from the spirit and scope of the claims as presented herein. Accordingly, the detailed description is to be regarded as illustrative in nature and not restrictive.

DETAILED DESCRIPTION OF THE INVENTION

Improved carbon fiber reinforced polyolefin compositions are provided herein that may be electrically conductive, have a relatively low density, have a high dimensional stability, or a combination thereof. For example, the compositions provided herein may have a density of about 0.90 to about 0.98 g/cm$^3$. Due to the fact that the compositions provided herein also may have suitable stiffness and cold temperature impact properties, the compositions provided herein may have various applications in multiple industries. For example, the compositions provided herein, alone or in combination with one or more other materials, may be used to form components, such as panels, for automobiles, water vessels, locomotives, recreational vehicles, airplanes, etc.

The compositions provided herein, alone or in combination with another material, may be used to form an automotive panel, such as a bumper fascia. When painted using a standard technique in the automatic industry, the automotive panels, including the bumper fascia, may be ductile at 0° C. under multiaxial impact (2.2 m/s, ASTM D3763). In some embodiments, the compositions provided herein allow for the preparation of injection molded parts having a reduced density while substantially maintaining or improving one or more of the following properties of a higher density resin: electrical conductivity, CLTE, cold temperature impact, low shrinkage, and dimensional stability.

The compositions provided herein, in embodiments, include (a) a thermoplastic olefin resin, (b) a filler component, (c) a compatibilizer, and (d) an additive package.

The compositions provided herein may have a density of about 0.9 to about 0.98 g/cm$^3$. In some embodiments, the composition has a density of about 0.90 g/cm$^3$ to about 0.97 g/cm$^3$. In further embodiments, the composition has a density from about 0.94 g/cm$^3$ to about 0.96 g/cm$^3$ and from about 0.924 g/cm$^3$ to about 0.950 g/cm$^3$.

The compositions provided herein may have an after-bake-mold-shrinkage (1 hour, 120° C.) of about 0.2% to about 0.7%.

The compositions provided herein may have a flexural modulus of about 1,200 MPa to about 3,000 MPa, about 1,500 MPa to about 2,200 MPa, about 1,600 MPa to about 2,000 MPa; or about 1,650 MPa to about 2,100 MPa.

The compositions provided herein may have a coefficient of linear thermal expansion of about 1 to about 8 ($10^{-5}$ mm/mm/° C.), about 2 to about 7 ($10^{-5}$ mm/mm/° C.); about 3 to about 6 ($10^{-5}$ mm/mm/° C.), about 5 to about 8 ($10^{-5}$ mm/mm/° C.), about 3 to about 4 or about 5.5 to about 6.5 ($10^{-5}$ mm/mm/° C.).

The compositions provided herein may have a surface resistivity of $10^7$ Ohms-per-square or less.

The density, after-bake-mold-shrinkage, flexural modulus, coefficient of linear thermal expansion, and surface resistivity of the compositions can be measured according to the procedures described herein at Example 2.

In one embodiment, compositions provided herein have a density of about 0.9 to about 0.98 g/cm$^3$, about 0.90 g/cm$^3$ to about 0.97 g/cm$^3$, about 0.91 g/cm$^3$ to about 0.96 g/cm$^3$, about 0.924 g/cm$^3$ to about 0.96 g/cm$^3$, or about 0.94 g/cm$^3$ to about 0.96 g/cm$^3$; an after-bake-mold-shrinkage (1 hours, 120° C.) of about 0.2% to about 0.7%; a flexural modulus of about 1,200 MPa to about 3,000 MPa; a coefficient of linear thermal expansion of about 1 to about 8 ($10^{-5}$ mm/mm/° C.); and a surface resistivity of $10^7$ Ohms-per-square or less.

Thermoplastic Olefin

The thermoplastic olefin resin of the compositions provided herein may include [1] a polyolefin and an elastomer, or [2] a polyolefin, an elastomer, and a reactor thermoplastic polyolefin. The thermoplastic olefin resin may be present in the compositions provided herein at an amount of about 80% to about 95%, by weight, based on the total weight of the composition.

The polyolefin of the thermoplastic olefin resin may include [1] a polypropylene, [2] a propylene-ethylene copolymer, or [3] a combination thereof. The polypropylene may include a polypropylene homopolymer, or a blend of two or more polypropylene homopolymers. The two or more polypropylene homopolymers may have one or more different features, including, for example, different number and/or weight average molecular weights. The propylene-ethylene copolymer may be a copolymer in which the polymeric chains include a random assortment of the propylene and ethylene monomers. The propylene-ethylene copolymer may include a propylene-ethylene block copolymer. The propylene-ethylene copolymer may include a blend containing at least one propylene-ethylene block copolymer and at least one copolymer having polymeric chain(s) that include a random assortment of the monomers. In one embodiment, the polyolefin includes [1] a polypropylene homopolymer, and [2] a propylene-ethylene copolymer having polymeric chains that include a random assortment of the monomers. In another embodiment, the polyolefin includes [1] a blend of two or more polypropylene homopolymers, and [2] a propylene-ethylene copolymer having a polymeric chain that includes a random assortment of the monomers. In a further embodiment, the polyolefin includes [1] a polypropylene homopolymer, and [2] a propylene-ethylene block copolymer. In yet another embodiment, the polyolefin includes [1] a blend of two or more polypropylene homopolymers, and [2] a propylene-ethylene block copolymer. In a still further embodiment, the polyolefin includes [1] a polypropylene homopolymer, [2] a propylene-ethylene block copolymer, and [3] a propylene-ethylene copolymer having a polymeric chain that includes a random assortment of the monomers. In yet another embodiment, the polyolefin includes [1] a blend of two or more polypropylene homopolymers, [2] a propylene-ethylene block copolymer, and [3] a propylene-ethylene copolymer having a polymeric chain that includes a random assortment of the monomers. In particular embodiments, the polyolefin includes a polypropylene having high crystallinity homopolymer portions. "High crystallinity" refers to polypropylene with a percentage of mesopentad greater than 97%, as determined by high field NMR (see, e.g., WIPO PCT Patent Application Publication No. WO 2009/045351, which is incorporated herein by reference).

The polyolefin may be present in the compositions provided herein at an amount of about 40% to about 65%, or about 40% to about 60%, by weight, based on a total weight of the composition.

The polyolefin also may have a combined melt flow rate (MFR, ASTM D1238, 230° C., 2.16 kg) of about 60 g/10 min to about 400 g/10 min, or about 120 to about 350 g/10 min. Therefore, it is understood that components of the polyolefin having melt flow rates higher than those disclosed herein or lower than those disclosed herein may be utilized in order to obtain a blended polyolefin having an overall melt flow rate (MFR, ASTM D1238, 230° C., 2.16 kg) of about 60 g/10 min to about 400 g/10 min, or about 120 to about 350 g/10 min.

Non-limiting examples of suitable components of the polyolefin include commercially available polypropylenes, including ADSTIF™, METOCENE™, PROFAX™, or a combination thereof, which are available from LyondellBasell Industries (Houston, Tex., USA).

In embodiments, the polyolefin includes a reactor thermoplastic polyolefin.

The reactor thermoplastic polyolefin may be present in the compositions provided herein at an amount of about 0.01% to about 15%, or about 11%, by weight, based on the total weight of the composition.

The reactor thermoplastic polyolefin may have a melt flow rate (MFR, ASTM D1238, 230° C., 2.16 kg) of about 0.5 g/10 min to about 30 g/10 min, about 1 g/10 min to about 20 g/10 min, or about 2 g/10 min to about 10 g/10 min.

Non-limiting examples of suitable components of the reactor thermoplastic polyolefin include ADFLEX™, HIFAX™, SOFTELL™, or a combination thereof, which are available from LyondellBasell Industries (Houston, Tex., USA).

In embodiments, the polyolefin includes an elastomer. The elastomer may include an ethylene-based copolymer. The ethylene-based copolymer may be selected from an ethylene-propylene copolymer, an ethylene-butene copolymer, an ethylene-hexene copolymer, an ethylene-octene copolymer, or a combination thereof.

In one embodiment, the elastomer comprises an ethylene-based copolymer having a density of about 0.85 g/cm$^3$ to about 0.90 g/cm$^3$, or about 0.87 g/cm$^3$ to about 0.90 g/cm$^3$. In another embodiment, the ethylene-based copolymer of the elastomer has a melt flow rate (190° C., 2.16 kg) of about 0.4 g/10 min to about 5 g/10 min, or about 0.6 g/10 min to about 2 g/10 min. In a further embodiment, the elastomer comprises an ethylene-based copolymer having a density of about 0.85 g/cm$^3$ to about 0.90 g/cm$^3$, and a melt flow rate (190° C., 2.16 kg) of about 0.4 g/10 min to about 5 g/10 min, or about 0.6 g/10 min to about 2 g/10 min.

The elastomer may include a single component, or two or more components. In one embodiment, the elastomer includes a first elastomer and a second elastomer, wherein the first elastomer and the second elastomer have different structures (e.g., different average molecule weights, composed of different monomers, different spatial arrangement of atoms due to branching, or a combination thereof). In one embodiment, the first elastomer comprises an ethylene-based copolymer having a density of about 0.85 g/cm$^3$ to about 0.90 g/cm$^3$. In another embodiment, the ethylene-based copolymer of the first elastomer has a melt flow rate (190° C., 2.16 kg) of about 0.4 g/10 min to about 5 g/10 min, or about 0.6 g/10 min to about 2 g/10 min. In a further embodiment, the first elastomer comprises an ethylene-based copolymer having a density of about 0.85 g/cm$^3$ to about 0.90 g/cm$^3$, and a melt flow rate (190° C., 2.16 kg) of about 0.4 g/10 min to about 5 g/10 min, or about 0.6 g/10 min to about 2 g/10 min. In another embodiment, the second elastomer comprises an ethylene-based copolymer having a melt flow rate (190° C., 2.16 kg) of about 0.5 g/10 min to about 30 g/10 min, about 2 g/10 min to about 10 g/10 min, or about 5 g/10 min. In yet another embodiment, the first elastomer comprises an ethylene-based copolymer having a density of about 0.85 g/cm$^3$ to about 0.90 g/cm$^3$, and a melt flow rate (190° C., 2.16 kg) of about 0.4 g/10 min to about 5 g/10 min, or about 0.6 g/10 min to about 2 g/10 min; and the second elastomer comprises an ethylene-based copolymer having a melt flow rate (190° C., 2.16 kg) of about 0.5 g/10 min to about 30 g/10 min, about 2 g/10 min to about 10 g/10 min, or about 5 g/10 min.

In embodiments, the elastomer is present at an amount of about 25% to about 45%, by weight, based on the total weight of the composition. When the elastomer includes a first elastomer and a second elastomer, then the first elastomer may be present at an amount of about 10% to about 25%, by weight, and about 12% to about 20%, by weight, based on the total weight of the composition, and the second elastomer may be present at an amount of about 6% to about 12%, by weight, based on the total weight of the composition.

Non-limiting examples of suitable components of the elastomer include VISTAMAXX® (ExxonMobil Corp.), ENGAGE® (Dow Chemical Co.), CATALLOY® (LyondellBasell Industries) brand and TAFMER® (Mitsui Chemicals, Inc.) brand.

Filler Component

The compositions provided herein also may include a filler component. The filler component may include a plurality of carbon fibers. The phrase "carbon fibers," as used herein, refers to fibers of, or including, carbon, which have a high aspect ratio, i.e., greater than 10:1. Not wishing to be bound by any particular theory, it is believed that the plurality of carbon fibers may ensure, at least in part, that the compositions provided herein have a desirable stiffness, electrical conductivity, and/or low CLTE.

The carbon fibers may have an average length of about 0.5 mm to about 300 mm, about 1 to about 200 mm, about 2 mm to 100 mm, or about 6 mm. The carbon fibers may have an average diameter of about 1 μm to about 30 μm, about 2 μm to about 20 μm, about 3 μm to about 10 μm, or about 7 μm. The phrase "average diameter" refers to the average largest dimension of the carbon fibers when viewed in cross-section. When viewed in cross-section, the carbon fibers may have a substantially circular shape, but all or a portion of the carbon fibers may have a non-circular shape when viewed in cross-section. Therefore, the term "diameter" should not be construed as limiting the carbon fibers to those having a substantially circular shape when viewed in cross-section. In one embodiment, the carbon fibers have an average length of about 0.5 mm to about 300 mm, about 1 to about 200 mm, about 2 mm to 100 mm, or about 6 mm, and an average diameter of about 1 μm to about 30 μm. In another embodiment, the carbon fibers have an average length of about 0.5 mm to about 300 mm, about 1 to about 200 mm, about 2 mm to 100 mm, or about 6 mm, and an average diameter of about 2 μm to about 20 μm. In a further embodiment, the carbon fibers have an average length of about 0.5 mm to about 300 mm, about 1 to about 200 mm, about 2 mm to 100 mm, or about 6 mm, and an average diameter of about 3 μm to about 10 μm. In yet another embodiment, the carbon fibers have an average length of about 0.5 mm to about 300 mm, about 1 to about 200 mm, about 2 mm to 100 mm, or about 6 mm, and an average diameter of about 7 μm. The carbon fibers of the compositions provided herein may be arranged in a non-woven structure, a woven structure, or a combination thereof. The filler component also may include a sizing agent.

The filler component may also include a filler material. Therefore, in one embodiment, the filler component includes a plurality of carbon fibers and a filler material. The filler material may include a talc having a high aspect ratio (i.e., at least 10:1), glass fibers, glass bubbles, mineral fibers, a biofiller, or a combination thereof. The biofiller may be selected from wood, flax, wheat straw, coconut, kenaf, hemp, or a combination thereof.

The filler component may be present in the compositions provided herein at an amount of about 1% to about 15%, about 1% to about 10%, or about 3% to about 5%, by weight, based on the total weight of the composition. When the filler component includes a filler material in addition to the plurality of carbon fibers, the filler material may be present at an amount of about 0.1% to about 10%, by weight, based on the total weight of the composition.

Non-limiting examples of suitable carbon fibers that may be used in the compositions provided herein may be obtained from Zoltek (St. Louis, Mo.) and Toho Tenax (Tokyo, Japan).

Compatibilizer

The compositions provided herein may include a compatibilizer. The compatibilizer may be present in the compositions provided herein at an amount of about 0.5% to about 10%, or about 0.5%, by weight, based on the total weight of the composition.

In embodiments, the compatibilizer includes a polyolefin modified with one or more polar groups. The one or more polar groups may include a carboxylic acid, an amine, a hydroxyl, an epoxide, or a combination thereof. In one embodiment, the compatibilizer comprises a maleic anhydride modified polypropylene. The one or more polar groups may be present at an amount of about 0.2% to about 5%, or about 0.5% to about 2%, by weight, based on the total weight of the compatibilizer.

In embodiments, the compatibilizer includes an impact-modifying compatibilizer, such as a styrene-ethylene-butylene-styrene (SEBS) rubber or a heterophasic polypropylene copolymer. The impact-modifying compatibilizer may be present in an amount of about 1% to about 10%, about 2% to about 8%, about 4% to about 6%, or about 4%, by weight, based on the total weight of the composition. In some embodiments, the styrene-ethylene-butylene-styrene (SEBS) rubber of the impact-modifying compatibilizer has a melt flow rate (230° C., 5.0 kg) of about 15 g/10 min to about 33 g/10 min, or a melt flow rate of about 22 g/10 min. In some embodiments, the heterophasic polypropylene copolymer has a melt flow rate (230° C., 2.16 kg) of about 0.1 g/10 min to about 2 g/10 min, about 0.35 g/10 min to about 1 g/10 min, or about 0.45 g/10 min.

In embodiments, the heterophasic polypropylene copolymer of the impact-modifying compatibilizer includes [1] about 30% to about 80%, about 30% to about 70%, or about 45% to about 55%, by weight, of a semi-crystalline polypropylene component (Component A) having a monomodal molecular weight distribution selected from the group consisting of a propylene homopolymer, a random copolymer of propylene containing up to 8% ethylene, a random copolymer of propylene containing up to 8% of at least one $C_4$-$C_{10}$ α-olefin, and any combination thereof optionally the semi-crystalline polypropylene may have a melt flow rate (MFR) of from 1 g/10 min to 500 g/10 min; and [2] about 20% to about 70%, about 40% to about 70%, or about 45% to about 55%, by weight, of a bipolymer component (Component B) of propylene and at least one comonomer selected from ethylene and/or $C_4$-$C_{10}$ α-olefins, the bipolymer containing from 50%-75% of propylene, wherein the bipolymer is soluble in xylene at room temperature and has an intrinsic viscosity [η] of about 4 to about 7.5 dl/g (in decalin); optionally Component B is soluble in xylene at room temperature and has about 25% to about 50%, or about 30% to about 45%, by weight, ethylene moieties and an intrinsic viscosity [η] at room temperature of about 4 dL/g to about 7 dL/g (in decalin); optionally Component B has a melt flow rate less than 0.15 g/10 min.

In some embodiments, the elastomer includes a first elastomer and a second elastomer; the compatibilizer includes an impact-modifying compatibilizer; and the combined weight percent of the first elastomer, the second elastomer, and the impact-modifying compatibilizer is about 25% to about 34%, or about 27% to about 33%, by weight, based on the total weight of the composition.

Non-limiting examples of suitable compatibilizers include POLYBOND® (Addivant, Danbury, Conn.), EXXELOR® (Exxon Mobil Co., Irving, Tex.), FUSABOND® (Dupont, USA), or a combination thereof.

Additive Packages

In embodiments, the compositions provided herein include an additive package. The additive package may include [1] one or more antioxidants; [2] one or more mold releases; [3] one or more scratch reduction additives; [4] one or more nucleating agents; [5] one or more neutralizers/acid scavengers; [6] stearic acid and/or a stearate salt; or [7] a combination thereof.

Non-limiting examples of neutralizers/acid scavengers include magnesium aluminum hydroxyl carbonate or hydrates thereof, stearic acid, a stearate salt, or a combination thereof. Not wishing to be bound by any particular theory, it is believed that magnesium aluminum hydroxyl carbonate hydrates can be effective in retarding hindered amine light stabilizer deactivation. A non-limiting example of a magnesium aluminum hydroxyl carbonate hydrate that may be used in the compositions provided herein is DHT-4A™ or DHT-4V™ by Kyowa Chemical Industry Co. Ltd. Non-limiting examples of antioxidants include one or more organophosphites. Non-limiting examples of mold releases include glycerol monostearate, stearic acid, stearate salts, magnesium stearate, calcium stearate, or a combination thereof (see, e.g., U.S. Pat. No. 3,886,105, which is incorporated herein by reference). The magnesium stearate also may act as a dispersion aid.

Non-limiting examples of scratch reduction additives include lubricants, such as fatty amides. Suitable fatty amides include oleamide ("OR"), ethylene bis-stearamide (EBS), and/or erucamide, and the like. For example, the oleamide (OR) may be CRODAMIDE® OR supplied by Croda; the erucamide (ER) may be CRODAMIDE® ER supplied by Croda; and the ethylene bis-stearamide (EBS) may be CRODAMIDE® EBS supplied by Croda.

Non-limiting examples of nucleating agents include hexahydrophthalic acid, a salt thereof, or an anhydride thereof (see, e.g., WIPO PCT Application Publication No. WO 2008/073401, which is incorporated herein by reference). The salt of hexahydrophthalic acid may be a calcium salt. The one or more nucleating agents may be present in the compositions provided herein at a combined amount of about 0.05% to about 3%, by weight, about 0.1% to about 0.2%, by weight, based on the total weight of the composition, or about 0.15%, by weight, based on the total weight of the composition.

The additive package also may include one or more of the following, which may be used in conventional amounts: a colorant, an odorant, a deodorant, a plasticizer, an impact modifier, a surfactant, a wetting agent, a flame retardant, an ultraviolet light stabilizer, an antioxidant, a biocide, a metal deactivating agent, a thickening agent, a heat stabilizer, a defoaming agent, a coupling agent, a polymer alloy compatibilizing agent, a blowing agent, an emulsifier, a cross-linking agent, a wax, a particulate, a flow promoter, or a combination thereof.

The additive package may be present in the compositions provided herein at an amount of about 0.5% to about 10%, or about 0.5% to about 5%, by weight, based on the total weight of the composition.

In embodiments, the additives of the additive package are added individually (or in combination) to the compositions provided herein directly, optionally while the composition is being blended or extruded, such that the additives of the additive package are distributed evenly in the compositions provided herein. This type of additive addition may be called a "salt and pepper addition." In other embodiments, the additives of the additive package may be pre-blended into a polymer carrier. The polymer carrier may be a homopolymer of polyethylene or polypropylene. The polymer carrier having entrained additives may be referred to as a masterbatch. The masterbatch may be added while the composition is being blended or extruded such that the additives are distributed substantially evenly in the composition. Optionally, the polymer carrier may be present at an amount of about 0.5% to about 2%, or about 1%, by weight, based on the total weight of the composition. In still further embodiments, at least one of the additives of the additive package may be added via a masterbatch route, and at least one of the additives of the additive packages may be added via a salt and pepper addition.

In yet another embodiment, multiple masterbatches may include different additives of the additive package. For example, a first masterbatch may include a colorant and a second masterbatch may include the remainder of the additives of the additive package. In embodiments using multiple masterbatches, the polymer carrier of each masterbatch may be the same or different.

Articles of Manufacture

In another aspect, articles of manufacture are provided that include one or more of the compositions described herein. In embodiments, the article is a part of an automobile, such as a molded part but may also include water vessels, locomotives, recreational vehicles, airplanes and other products. In some embodiments, the molded part is a bumper fascia, a bumper, a rocker, a cladding, a wheel flare, a door panel, or an instrument panel. In some embodiments, such molded parts may be used to assist the automotive industry in their pursuit of manufacturing lower weight cars with improved fuel efficiency and lower emissions. In further embodiments, the molded parts disclosed herein exhibit a property profile of current higher density compositions, e.g., those used for current bumper fascia resins. Such properties include, for example, increased stiffness, reduced gapping, consistent shrinkage and CLTE properties, while exhibiting a reduced density. In contrast to other lower density compositions known in the art, the compositions provided herein do not, in some embodiments, result in any increase, or any substantial increase, in CLTE or shrinkage.

In embodiments, the compositions provided herein are compatible with existing tooling and would not require any or only limited retooling expense. In some embodiments, the compositions provided herein contrast with other low density compositions by avoiding any increase in expansion/contraction gapping. The auto industry is pursuing reduced gapping for improved craftsmanship.

In embodiments, the articles may include embedded colorants. In other embodiments, the articles may be colored, painted, or sealed after (or before) being molded. In further embodiments, the articles may be coated with various materials to facilitate paintability. In still further embodiments, the articles may be coated with a clear seal or wax (before, after, or instead of being painted). The clear seal, wax, and/or paint (alone and in combination) may protect the article from elements such as the sun, wind, rain, road debris including dirt and bugs, tree pollen or sap, and/or bird droppings.

Methods

In another aspect, methods are provided of making a composition, the method comprising melt blending the constituents (a), (b), (c), and (d) to form a composition:

(a) a thermoplastic olefin resin comprising a polyolefin and an elastomer, wherein the thermoplastic olefin resin is present in the composition at an amount of about 80% to about 95%, by weight, based on the total weight of the composition, and the thermoplastic olefin resin comprises— (i) a polyolefin comprising a polypropylene, a propylene-ethylene copolymer, or a combination thereof, wherein the polyolefin is present at an amount of about 40% to about 65%, by weight, based on a total weight of the composition; and (ii) an elastomer, wherein the elastomer is present at an amount of about 25% to about 45%, by weight, based on the total weight of the composition;

(b) a filler component comprising a plurality of carbon fibers, wherein the filler component is present at an amount of about 1% to about 15%, by weight, based on the total weight of the composition;

(c) a compatibilizer, wherein the compatibilizer is present at an amount of about 0.5% to about 10%, by weight, based on the total weight of the composition; and (d) an additive package, wherein the additive package is present at an amount of about 0.5% to about 5%, by weight, based on the total weight of the composition, wherein the composition has a density of about 0.90 to about 0.98 g/cm$^3$. In one embodiment, the compositions have a density of about 0.90 to about 0.98 g/cm$^3$, about 0.90 g/cm$^3$ to about 0.97 g/cm$^3$, or about 0.94 g/cm$^3$ to about 0.96 g/cm$^3$; an after-bake-mold-shrinkage (1 hour, 120° C.) of about 0.2% to about 0.7%; a flexural modulus of about 1,200 MPa to about 3,000 MPa; a coefficient of linear thermal expansion of about 1 to about 8 ($10^{-5}$ mm/mm/° C.); and a surface resistivity of $10^7$ Ohms-per-square or less.

In embodiments, the methods provided herein include pelletizing the melt blended composition to form a plurality of pellets. In some embodiments, the methods comprise injection molding the plurality of pellets. In some embodiments, the constituents are melt blended with an extruder such as a high-intensity continuous mixer or an internal batch mixer (for example, a Banbury mixer or a twin-screw extruder). The plurality of carbon fibers of the filler component may be fed downstream, or to the main feeder.

The term "olefin" as used in this application refers to an alkene wherein at least one carbon-carbon double bond in the molecule is a terminal double bond. Some non-limiting examples of olefins include styrene, ethylene, propylene, butene, pentene, hexene, heptene, octene, nonene, decene, and dodecene.

The term "elastomer" refers to polymer compounds having rubber-like properties and crystallinity in the range of from about 0 percent to about 20 percent. In some embodiments, the polymer can have crystallinity in the range of from about 0 percent to about 5 percent and at least 0.1 percent.

In the present description, the term "heterophasic polypropylene copolymer" refers to a copolymer (or rubber copolymer) prepared by the copolymerization of ethylene and propylene dispersed into a polypropylene matrix. The polypropylene matrix may be a homopolymer or a copolymer.

The term "homopolymer" and similar terms mean a polymer consisting solely or essentially of units derived from a single kind of monomer, e.g., ethylene homopolymer is a polymer comprising solely or essentially of units derived from ethylene, and propylene homopolymer is a polymer comprising solely or essentially of units derived from propylene, and the like.

The term "impact-modifying compatibilizer" means a compound that synergistically interacts with the interface of the elastomeric ethylene copolymer composition and the polyolefin to improve the properties of the overall composition. For the purposes of the present disclosure the term "impact-modifying compatibilizer" includes the styrene-ethylene-butylene-styrene (SEBS) rubber and the heterophasic polypropylene copolymer described above.

The terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer comprises units derived from the monomers, e.g., —$CH_2$—$CH_2$—, and not the monomer itself, e.g., $CH_2$=$CH_2$.

The term "polymer" means a macromolecular compound prepared by polymerizing monomers of the same or different type. The term "polymer" includes homopolymers, copolymers, terpolymers, interpolymers, and so on.

The term "interpolymer" means a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

The term "polymer composition" refers to a composition made from and/or containing at least one polymer.

The term "polyolefin" as used herein includes polymers such as polyethylene, polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler-Natta, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

The term "room temperature" refers to a temperature around 23 degrees Celsius (unless it is defined differently in an ASTM, in which case "room temperature" means as defined within that ASTM for that particular test/procedure/method).

The term "thermoplastic polymer" means a polymer that softens when exposed to heat and returns to its original condition when cooled to room temperature.

The above definitions supersede any conflicting definition in any reference that is incorporated by reference herein. The fact that certain terms are defined, however, should not be considered as indicative that any term that is undefined is indefinite. Rather, all terms used are believed to describe the appended claims in terms such that one of ordinary skill can appreciate.

In the descriptions provided herein, the terms "includes," "is," "containing," "having," and "comprises" are used in an open-ended fashion, and thus should be interpreted to mean "including, but not limited to." When methods and composite materials are claimed or described in terms of "comprising" various components or steps, the composite materials and methods can also "consist essentially of" or "consist of" the various components or steps, unless stated otherwise.

Throughout this application, the term "about" is used to indicate that a value includes the variation of error for the device, the method being employed to determine the value, or the variation that exists among the studies.

The terms "a," "an," and "the" are intended to include plural alternatives, e.g., at least one. For instance, the disclosure of "a polyolefin," "an elastomer," "a filler component", and the like, is meant to encompass one, or mixtures or combinations of more than one polyolefin, elastomer, filler component, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, all numerical end points of ranges disclosed herein are approximate. As a representative example, Applicant discloses, in one embodiment, that the compositions have a density of about 0.9 to about 0.98 g/cm$^3$. This range should be interpreted as encompassing weight percentages in a range of about 0.9 g/cm$^3$ to about 0.98 g/cm$^3$, and further encompasses "about" each of 0.91 g/cm$^3$, 0.92 g/cm$^3$, 0.93 g/cm$^3$, 0.94 g/cm$^3$, 0.95 g/cm$^3$, 0.96 g/cm$^3$, and 0.97 g/cm$^3$, including any ranges and sub-ranges between any of these values.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation of Compositions

Three embodiments of the compositions provided herein were prepared by withdrawing the blended components of Table 1 from a twin screw extruder. The weight percentages provided at Table 1 were based on the total weight of each composition.

In each of the three embodiments of this example, the filler component included carbon fibers. The carbon fibers were fed downstream for Samples 1 and 2, and at the main feeder for Sample 3. Two data points (separated by a comma) for some of the embodiments disclosed in Table 1 are provided below. Table 1 is read in a column. For example, the first Sample 1 had 18 wt. % Polyolefin A; 2.65 wt. % Polyolefin B; 20 wt. % Polyolefin C; 5 wt. % Filler Component; etc.

TABLE 1

|  | Raw Materials | MFR | Condition | Sample 1 (wt. %) | Sample 2 (wt. %) | Sample 3 (wt. %) |
| --- | --- | --- | --- | --- | --- | --- |
| Thermoplastic Olefin Resin | Polyolefin A (PP homopolymer) | 1800 | 230° C., 2.16 kg | 18, 13.9 | 20, 6 | 7, 10 |
|  | Polyolefin B (PP homopolymer) | 120 | 230° C., 2.16 kg | 2.65, 6.05 | 13.7 | 30.35, 10.65 |
|  | Polyolefin C (PP Copolymer) | 105 | 230° C., 2.16 kg | 20, 21.7 | 31.65, 30 | 10, 27.8 |
|  | Polyolefin C (PP Copolymer) | 18 | 230° C., 2.16 kg |  |  | 5 |

TABLE 1-continued

| | Raw Materials | MFR | Condition | Sample 1 (wt. %) | Sample 2 (wt. %) | Sample 3 (wt. %) |
|---|---|---|---|---|---|---|
| | Reactor thermoplastic polyolefin | 2.5 | 230° C., 2.16 kg | 11, 11.5 | | 10 |
| | Elastomer (C2-Cx copolymer) | 1.2 | 190° C., 2.16 kg | 41, 29.5 | 41, 42.15 | 15.3, 41.2 |
| | Elastomer (C2-Cx copolymer) | 5 | 190° C., 2.16 kg | 8.5 | | 16 |
| Compatibilizer | Maleic anhydride modified PP homopolymer | 50 | 230° C., 5 kg | 0.5, 0.5 | 0.5, 0.5 | 0.5, 0.5 |
| Filler Component | Chopped carbon strand | | | 5, 6.5 | 5, 5.8 | 5, 8 |
| Additive Package | Antioxidant | | | 0.2, 0.2 | 0.2, 0.2 | 0.2, 0.2 |
| | Nucleator | | | 0.2, 0.2 | 0.2, 0.2 | 0.2, 0.2 |
| Colorant | Antistatic Agent | | | 0.4, 0.4 | 0.4, 0.4 | 0.4, 0.4 |
| | Acid Scavengers | | | 0.05, 0.05 | 0.05, 0.05 | 0.05, 0.05 |
| | Colorant (Carbon black masterbatch) | | | 1, 1 | 1, 1 | 1, 1 |

Examples 2—Characteristics of Compositions

Samples 1-3 of Example 1 were subjected to a series of tests, the results of which are provided at Table 2. Two data points (separated by a comma) for some of the embodiments disclosed in Table 2 are provided below. Table 2 is read in a column. For example, the first Sample 1 had a density of 0.93 g/cm$^3$; an MFR of 21.4 g/10 minute; and a flexural modulus of 2785 MPa; etc.

The term "ASTM D1238" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin was extruded through a die with a specified length and orifice diameter under prescribed conditions of temperature, load, and piston position in the barrel. This test method was

TABLE 2

| Property | Standard | Units | Sample 1 | Sample 2 | Sample 3 |
|---|---|---|---|---|---|
| Density | ISO 1183 | g/cm$^3$ | 0.93, 0.921 | 0.92, 0.917 | 0.92, 0.929 |
| Melt Flow Rate (2.16 kg/230° C.) | ASTM 1238 | g/10 minute | 21.4, 30 | 40.4, 22.0 | 23.6, 23.3 |
| Flexural Modulus @ 23° C. | ISO 178 | MPa | 2785, 2343 | 2393, 2204 | 1616, 2652 |
| Tensile Modulus | ISO 527-1/2 | MPa | 2640 | 2577 | 1898 |
| Tensile Stress at Yield | ISO 527-1/2 | MPa | 18.9, 25.8 | 14.7, 21.7 | 19.0, 22.9 |
| Notched Charpy Impact Strength at 22° C. | ISO 179/1eA | kJ/m$^2$ | 14.2, 16.9 | 43.7, 15.7 | 14.2 |
| Notched Charpy Impact Strength at −30° C. | ISO 179/1eA | kJ/m$^2$ | 6.9, 5.2 | 7.6, 5.47 | 4.1, 5.15 |
| Multiaxial Impact at 0° C. and 2.2 m/s, Energy at Peak (percentage of ductile failure) | ASTM D3763 | J | 13.7, 8.2 (both at 100%) | 19.2, 13.5 (both at 100%) | 9.9 (100%) |
| HDT - 1.8 MPa | ISO 75-1/2 | ° C. | 67 | 54 | 54, 74.3 |
| Mold Shrink | ISO 294-3/4 | % | 0.23, 0.29 | 0.34, 0.25 | 0.53, 0.21 |
| After Bake Shrink (1 hr@121° C.) | ISO 294-3/4 | % | 0.30, 0.39 | 0.58, 0.35 | 0.71, 0.30 |
| CLTE - Parallel to Flow, −30 to +110° C. | ISO 11359-2 (TMA) | 10$^{-6}$ mm/mm/° C. | 34.2 | 47.6 | 35.9 |
| CLTE - Normal to Flow, −30 to +110° C. | ISO 11359-2 (TMA) | 10$^{-6}$ mm/mm/° C. | 21.5 | 25.4 | 19.3 |
| Multiaxial Impact at 0° C., Single Coated in White, Percentage of Ductile Failure | ASTM D3763 | | 100 | 100 | 100 |
| Multiaxial Impact at 0° C., Triple Coated in White, Percentage of Ductile Failure | ASTM D3763 | | 100 | 100 | 100 |
| Surface Resistivity | Pinion/Voyager Model SRM-110 Combination Surface Resistivity Meter | Ω/Square | 10$^4$, 10$^5$ | 10$^5$, 10$^6$ | 10$^{11}$, 10$^{4-5}$ |

The data in Table 2 were collected according to the following techniques.

(a) Melt Mass Flow Rates (MFR)—Melt mass flow rates (MFR) were given in gram/10 min and were measured using ASTM D1238, which is entitled "Test Method for Melt Flow Rates of Thermoplastics by Extrusion Plastometer," under the conditions specified below.

approved on Aug. 1, 2013 and published in August 2013, the contents of which are incorporated herein by reference in its entirety. The referenced ASTM standards can be found at the ASTM website, www.astm.org, or by contacting ASTM Customer Service at service@astm.org.

(b) Density—Density in g/cm$^3$ was measured using ISO 1183-1, which is entitled "Plastics-Methods for Determining the Density of Non-Cellular Plastics—Part 1: Immersion Method, Liquid Pycnometer Method and Titration Method." The term "ISO 1183-1" as used herein refers to the test method published as the second edition dated May 15, 2012, the content of which is incorporated herein by reference in its entirety.

(c) Flexural Modulus—Flexural modulus (or "flex modulus") was calculated in megapascals (MPa) and measured using ISO 178, which is entitled "Plastics—Determination of Flexural Properties." The term "ISO 178" as used herein refers to the test method published as the fifth edition dated Dec. 15, 2010, the content of which is incorporated herein by reference in its entirety.

(d) Charpy Notched Impact Strength—Charpy notched impact strength (or "Notched Charpy Impact Strength") was calculated in KJ/m$^2$ and measured using ISO 179-1, which is entitled "Plastics—Determination of Charpy Impact Properties. Part 1: Non-Instrumented Impact Test." The term "ISO 179" or "179-1" as used herein refers to the test method published as the second edition dated Jun. 15, 2010, the content of which is incorporated herein by reference in its entirety.

(e) Multi-Axial Instrumented Impact—Multi-Axial Instrumented Impact (MAII) energy values were given in J (joules) and a percentage ductile failure mode was recorded, and measured using ASTM D3763, which is entitled "Standard Test Method for High Speed Puncture Properties of Plastics Using Load and Displacement Sensors." The term "ASTM D3763" as used herein refers to the test method was approved on Sep. 1, 2015 and published in September 2015, the content of which is incorporated herein by reference in its entirety.

(f) Coefficient of Linear Thermal Expansion—The Coefficient of Linear Thermal Expansion (CLTE), which was measured through Thermal Mechanical Analysis (TMA) of annealed test specimens cut from injection molded plaques, was calculated in ($10^{-5}$ mm/mm/° C.) as an average of three data points in the flow direction and three data points in the cross flow direction. Each data point was measured using ISO 11359-2, which is entitled "Plastics-Thermomechanical Analysis (TMA)—Part 2: Determination of Coefficient of Linear Thermal Expansion and Glass Transition Temperature." The term "ISO 11359-2" as used herein refers to the test method published as the first edition dated Oct. 1, 1999, the content of which is incorporated herein by reference in its entirety.

(g) As-Molded Shrinkage—The as-molded shrinkage was measured by molding a 4×6×⅛ inch plaque, allowing the plaque to cool to room temperature and re-conditioned over 24 hours, and measuring the average shrinkage utilizing a fixed gauge.

(h) After-Bake-Mold-Shrinkage—The after-bake-mold-shrinkage was measured by heating a room temperature, molded 4×6×⅛ inch plaque to a set temperature of 120° C. for either an hour or a half hour (as indicated), and measuring the average shrinkage after it was returned to room temperature and re-conditioned (or allowed to stabilize by leaving it at room temperature and a controlled humidity for over 24 hours) utilizing a fixed gauge.

(i) Surface Resistivity—Surface Resistivity was measured by the Pinion/Voyager model SRM-110 Combination Surface Resistivity meter, which incorporated a three point probe measuring technique. The surface resistivity was recorded as ten to the power in Ohms/Square.

(j) Heat Deflection Temperature (HDT)—HDT was calculated in ° C. and measured using ISO 75-2, Method A, which is entitled "Plastics—Determination of temperature of deflection under load—Part 2: plastics and ebonite." The term "ISO 75" or "75-2" as used herein refers to the test method published as the 3rd edition dated Apr. 15, 2013, the content of which is incorporated herein by reference in its entirety.

We claim:

1. A composition comprising:
(a) a thermoplastic olefin resin comprising a polyolefin and an elastomer, wherein the thermoplastic olefin resin is present in the composition at an amount of about 80% to about 95%, by weight, based on the total weight of the composition, and the thermoplastic olefin resin comprises:
  (i) a polyolefin comprising a blend of two or more polypropylene homopolymers and a propylene-ethylene copolymer having a polymeric chain that includes a random assortment of monomers, wherein the two or more polypropylene homopolymers have different number and/or weight average molecular weight, wherein the polyolefin is present at an amount of about 40% to about 65%, by weight, based on a total weight of the composition, and wherein the polyolefin has a melt flow rate (MFR, ASTM D1238, 230° C., 2.16 kg) of about 60 g/10 min to about 400 g/10 min, and
  (ii) an elastomer, wherein the elastomer is present at an amount of about 25% to about 45%, by weight, based on the total weight of the composition, wherein the elastomer is different from the propylene-ethylene copolymer;
(b) a filler component comprising a plurality of carbon fibers, wherein the filler component is present at an amount of about 1% to about 15%, by weight, based on the total weight of the composition, and wherein the plurality of carbon fibers has an average length of about 0.5 mm to about 300 mm and an average diameter of about 1 μm to about 30 μm;
(c) a compatibilizer, wherein the compatibilizer is present at an amount of about 0.5% to about 10%, by weight, based on the total weight of the composition; and
(d) an additive package, wherein the additive package is present at an amount of about 0.5% to about 10%, by weight, based on the total weight of the composition; wherein the composition has a density of 0.90 g/cm$^3$ to 0.95 g/cm$^3$, has a flexural modulus of 1,500 MPa to 3,000 MPa, and has a surface resistivity of $10^7$ Ohms-per-square or less.

2. The composition of claim 1, wherein the thermoplastic olefin resin further comprises a reactor thermoplastic polyolefin, and the reactor thermoplastic polyolefin is present at an amount of about 0.01% to about 15%, by weight, based on the total weight of the composition.

3. The composition of claim 2, wherein the reactor thermoplastic polyolefin has a melt flow rate (MFR, ASTM D1238, 230° C., 2.16 kg) of about 0.5 g/10 min to about 30 g/10 min.

4. The composition of claim 2, wherein the polyolefin has a melt flow rate (MFR, ASTM D1238, 230° C., 2.16 kg) of about 70 g/10 min to about 370 g/10 min.

5. The composition of claim 2, wherein the elastomer comprises an ethylene-based copolymer having a density of about 0.85 g/cm$^3$ to about 0.90 g/cm$^3$.

6. The composition of claim 2, wherein the elastomer comprises an ethylene-based copolymer, and wherein the ethylene-based copolymer has a melt flow rate (190° C., 2.16 kg) of about 0.4 g/10 min to about 5 g/10 min.

7. The composition of claim 2, wherein the plurality of carbon fibers has an average length of about 1 mm to about 200 mm and an average diameter of about 1 μm to about 30 μm.

8. The composition of claim 2, wherein the compatibilizer comprises a polyolefin modified with one or more polar groups selected from a carboxylic acid, an amine, a hydroxyl, an epoxide, or a combination thereof.

9. The composition of claim 2, wherein the additive package comprises:
   (i) one or more antioxidants;
   (ii) one or more mold releases selected from glycerol monostearate, stearic acid, a stearate salt, magnesium stearate, and calcium stearate;
   (iii) one or more scratch reduction additives;
   (iv) one or more nucleating agents;
   (v) one or more neutralizers/acid scavengers selected from magnesium aluminum hydroxyl carbonate or hydrates thereof, stearic acid, a stearate salt;
   (vi) stearic acid and/or a stearate salt;
   (vii) a colorant;
   (viii) an odorant;
   (ix) a deodorant;
   (x) a plasticizer;
   (xi) an impact modifier;
   (xii) a surfactant;
   (xiii) a wetting agent;
   (xiv) a flame retardant;
   (xv) an ultraviolet light stabilizer;
   (xvi) a biocide;
   (xvii) a metal deactivating agent;
   (xviii) a thickening agent;
   (xix) a heat stabilizer;
   (xx) a defoaming agent;
   (xxi) a coupling agent;
   (xxii) a polymer alloy compatibilizing agent;
   (xxiii) a blowing agent;
   (xxiv) an emulsifier;
   (xxv) a crosslinking agent;
   (xxvi) a wax;
   (xxvii) a particulate;
   (xxviii) a flow promoter; or
   (xxix) a combination thereof.

10. The composition of claim 2, wherein the composition has an after-bake-mold-shrinkage (1 hours, 120° C.) of about 0.2% to about 0.7%.

11. The composition of claim 2, wherein the composition has a flexural modulus of 1,600 MPa to 2,200 MPa.

12. The composition of claim 2, wherein the composition has a coefficient of linear thermal expansion of about 1 to about $8*10^{-5}$ mm/mm/° C.

13. The composition of claim 2, wherein the composition has a surface resistivity of $10^7$ to $10^4$ Ohms-per-square.

14. An article of manufacture comprising the composition of claim 2, wherein the article is an automotive panel or a bumper fascia.

15. A method of making a composition, the method comprising:
   melt blending constituents (a), (b), (c), and (d) to form a composition, wherein the constituents (a), (b), (c), and (d) comprise:
   (a) a thermoplastic olefin resin comprising a polyolefin and an elastomer, wherein the thermoplastic olefin resin is present in the composition at an amount of about 80% to about 95%, by weight, based on the total weight of the composition, and the thermoplastic olefin resin comprises:
      a polyolefin comprising a blend of two or more polypropylene homopolymers and a propylene-ethylene copolymer having a polymeric chain that includes a random assortment of monomers, wherein the two or more polypropylene homopolymers have different number and/or weight average molecular weight, wherein the polyolefin is present at an amount of about 40% to about 65%, by weight, based on a total weight of the composition, and wherein the polyolefin has a melt flow rate (MFR, ASTM D1238, 230° C., 2.16 kg) of about 60 g/10 min to about 400 g/10 min; and
      (ii) an elastomer, wherein the elastomer is present at an amount of about 25% to about 45%, by weight, based on the total weight of the composition, wherein the elastomer is different from the propylene-ethylene copolymer;
   (b) a filler component comprising a plurality of carbon fibers, wherein the filler component is present at an amount of about 1% to about 15%, by weight, based on the total weight of the composition, and wherein the plurality of carbon fibers has an average length of about 0.5 mm to about 300 mm and an average diameter of about 1 μm to about 30 μm;
   (c) a compatibilizer, wherein the compatibilizer is present at an amount of about 0.5% to about 10%, by weight, based on the total weight of the composition; and
   (d) an additive package, wherein the additive package is present at an amount of about 0.5% to about 5%, by weight, based on the total weight of the composition, wherein the composition has a density of 0.90 to 0.95 g/cm$^3$, has a flexural modulus of 1,500 MPa to 3,000 MPa, and has a surface resistivity of $10^7$ Ohms-per-square or less, and
   wherein the plurality of carbon fibers of the filler component is fed downstream.

* * * * *